(12) United States Patent
Cortese et al.

(10) Patent No.: US 11,113,621 B2
(45) Date of Patent: Sep. 7, 2021

(54) SYSTEM AND TECHNIQUE FOR LOADING CLASSICAL DATA INTO A QUANTUM COMPUTER

(71) Applicant: Massachusetts Institute of Technology, Cambridge, MA (US)

(72) Inventors: John Cortese, Reading, MA (US); Timothy Braje, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 462 days.

(21) Appl. No.: 16/239,983

(22) Filed: Jan. 4, 2019

(65) Prior Publication Data

US 2019/0213493 A1    Jul. 11, 2019

Related U.S. Application Data

(60) Provisional application No. 62/614,685, filed on Jan. 8, 2018.

(51) Int. Cl.
G06N 10/00    (2019.01)

(52) U.S. Cl.
CPC .................................... *G06N 10/00* (2019.01)

(58) Field of Classification Search
CPC ...................................................... G06N 10/00
See application file for complete search history.

(56) References Cited

U.S. PATENT DOCUMENTS

2017/0179960 A1*   6/2017 Hastings ................ G06N 10/00

OTHER PUBLICATIONS

Cortese; "Loading Classical Data into a Quantum Computer"; arXiv:1803.01958v1; Mar. 5, 2018; 38 Pages.
Harrow, et al.; "Quantum algorithm for linear systems of equations"; arXiv:0811.3171v3; Sep. 30, 2009; 15 Pages.
Shor; "Algorithms for Quantum Computation: Discrete Logarithms and Factoring"; Proceedings of the 35th IEEE Symposium on the Foundations of Computer Science; pp. 124-134; Jan. 1, 1994; 11 Pages.

* cited by examiner

*Primary Examiner* — Matthew L Reames
(74) *Attorney, Agent, or Firm* — Daly, Crowley, Mofford & Durkee, LLP

(57) ABSTRACT

Quantum circuits and methods load $N=2^n$ classical bits into an entangled quantum output state using a gate depth of order $O(n)$. Loading is accomplished by dividing the $2^n$ input bits into data words and entangling these data words using ancilla qubits. The output of the circuit consists of one data word and one or several index qubits, drawn from the ancilla, to select between the input data words. Entanglement of the data words is performed in a single time slice (i.e. with a gate depth of 1), while the number of sequential gates needed to produce the appropriate pre-entanglement quantum state in the ancilla, and to disentangle the non-output ancilla, has the desired order $O(n)$. Also disclosed is a circuit for disentangling qubits used to store non-output data words during processing.

20 Claims, 11 Drawing Sheets

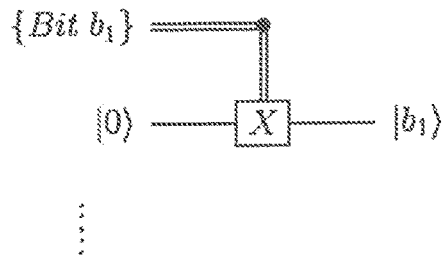
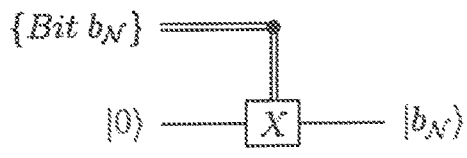
Fig. 2 (prior art)
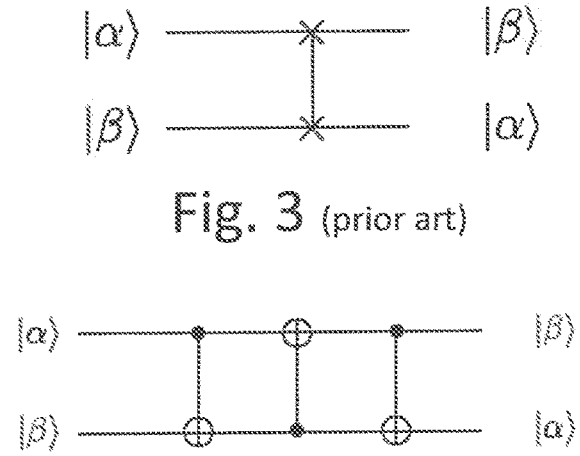
Fig. 3 (prior art)
Fig. 3A (prior art)
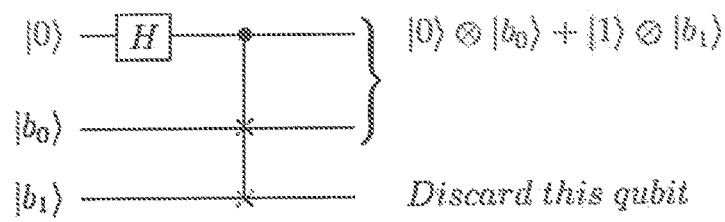
Fig. 4 (prior art)
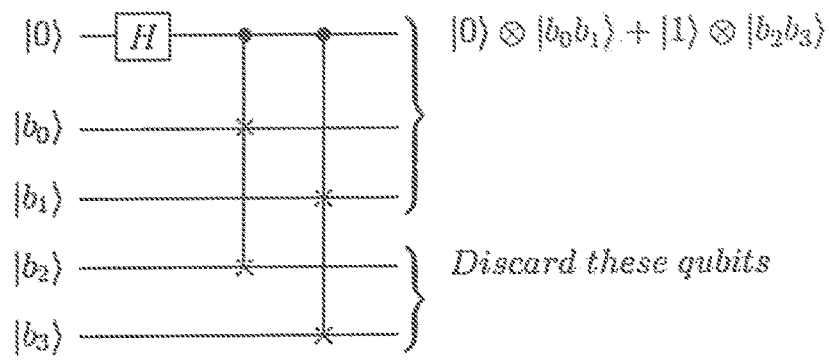
Fig. 5 (prior art)

SYSTEM AND TECHNIQUE FOR LOADING CLASSICAL DATA INTO A QUANTUM COMPUTER

CROSS-REFERENCE TO RELATED APPLICATION

This application claims the benefit of U.S. Provisional Application 62/614,685, filed 8 Jan. 2018, the entire contents of which are hereby incorporated by reference herein.

STATEMENT REGARDING FEDERALLY SPONSORED RESEARCH

This invention was made with Government support under Grant No. FA8702-15-D-0001 awarded by the U.S. Air Force. The Government has certain rights in the invention.

FIELD

The disclosure pertains generally to quantum computers, and particularly to efficiently loading classical data into a quantum computer for quantum computation therewith.

BACKGROUND

Computational complexity theory classifies the behavior of computing hardware according to the ease with which algorithms can be executed. Put another way, computational complexity theory gauges the degree of difficulty for a computer to solve broad classes of mathematical problems. This theory considers the amount of time required to arrive at a solution to a problem as a function of the problem's input size. That is, if S is a variable that represents the spatial axis in FIG. 1 and T is a variable that represents the time until a solution for a problem of spatial size S is found, then the computational complexity function CC represents the mathematical relationship between the space S and time T resources, namely T=CC(S).

Considering this complexity, quantum computers are a fundamentally more powerful computing paradigm than classical computers due to quantum entanglement. Quantum entanglement is a phenomenon in which separate physical objects interact collectively so that their measurable physical properties are fundamentally correlated. In other words, once entangled, a complete description of the properties of any one object must refer to all its entangled objects. Because entangling unifies the properties of objects, operations on one entangled object affects the properties of all such objects simultaneously, leading to vastly increased computational efficiency. For example, Peter Shor and Alexei Kitaev have described, for some computational problems, quantum algorithms whose computational complexity is a logarithmic function of the complexity of a corresponding best-known classical algorithm for solving the same problems. This logarithmic reduction in complexity corresponds to an exponential reduction in computing time T, opening the door to new classes of computations which can be executed in a reasonable allotted time frame.

To achieve such exponential speedups in a quantum computer, however, requires three generic stages of execution. First, computational data are loaded from a classical computer into a quantum computer in an entangled state. Next, the quantum computer performs a quantum computation on the entangled data using a quantum algorithm. Finally, the quantum state of the computer is measured to produce a classical data output containing the result of the computation.

FIG. 2 schematically shows, using quantum circuit notation, parallel loading of N bits of classical data into a quantum computer in an unentangled state. The circuit diagram data flow is always left to right in quantum circuits. In FIG. 2, doubled lines represent classical wires conveying a classical bit value (i.e. either 0 or 1). Single lines are quantum wires along which quantum states move, for example within qubits—the quantum analog of classical bits. The box with the "X" inside is a quantum bit flip gate. The quantum bit flip gate acts the same on quantum states as a classical inverter gate does on classical bits, reversing the value of the qubit. In both the classical and quantum scenario bit flip gate action, a "0" goes to a "1" and a "1" goes to a "0".

In the circuit shown in FIG. 2, the quantum bit flip gate is controlled by a classical wire feeding into the top of the gate. The solid dot indicates the control wire for the corresponding box/gate action. If the classical control wire carries a "0" value (i.e. as reflected by a certain voltage in the wire), then the bit flip gate is not executed and the output qubit $b_1$ has quantum state $|0>$, written in standard Dirac notation. If the classical control wire carries a "1" value (as reflected by a different voltage in the wire), then the bit flip gate is executed and the output qubit $b_1$ has quantum state $|1>$. This operation is performed in parallel for each bit $b_1$ through $b_N$.

The N qubit quantum state $\psi$ produced by the input circuit of FIG. 2 is represented mathematically as the tensor product of the quantum states of the N individual qubits, to form a quantum "word" of size N:

$$\psi = |b_1\rangle \otimes |b_2\rangle \otimes \ldots |b_N\rangle = |b_1 b_2 \ldots b_N\rangle.$$

However, the quantum state shown above is inadequate for use as input to a quantum algorithm exhibiting exponential speedup because it is not entangled. It is appreciated that there is a need in the art for efficiently implementing the entanglement required to perform generic quantum algorithms.

Some conventional quantum computational circuitry for entangling qubits is illustrated in FIGS. 3 through 5. FIG. 3 shows a quantum swap gate interchanging the states of two qubits. Thus, if the state of the two-qubit word on the left (input) side of the circuit is $|\alpha\beta>$ then the state of the two-qubit word on the right (output) side of the circuit is $|\beta\alpha>$. An implementation using three controlled-NOT (CNOT) gates is shown in FIG. 3A. The CNOT gate is the purely quantum equivalent of the controlled bit flip gate above.

To understand this implementation, suppose the first state $|\alpha>=|0>$. Then the first CNOT gate performs no action, the second CNOT gate sets $|\alpha>=|\beta>$, and the third CNOT gate sets $|\beta>=|0>$ (i.e., the input value of $|\alpha>$). Thus the input state $|0\beta>$ is transformed to the output state $|\beta0>$. A similar analysis may be performed for the input state $|\alpha>=|1>$, showing the circuit transforms $|1\oplus>$ to $|\beta1>$.

FIG. 4 schematically shows a quantum entanglement circuit built using a controlled swap ("C-Swap") gate. The Hadamard gate (the box with the "H" inside) performs the transformations $|0>\rightarrow|0>|1>$ and $|1>\rightarrow|0>-|1>$ (where the quantum normalization coefficient $1/\sqrt{2}$ known in the art has been omitted). That is, the output of the Hadamard gate is a linear combination, or superposition, of quantum states that both appear in the "downstream" portions of the circuit.

The three-qubit input state for the quantum circuit is $|0\ b_0\ b_1>$. Since the superposition $|0>+|1>$ on the first qubit after the Hadamard gate controls if the two qubits are swapped into its output, the three-qubit output is $|0\, b_0\, b_1\rangle + |1\, b_1\, b_0\rangle$, which is a superposition of no swap in the $|0\rangle$ case and a swap in the $|1\rangle$ case. A final, entangled two-qubit output quantum state of $|0\, b_0\rangle + |1\, b_1\rangle$, namely a superposition of the first qubit $b_0$ in the $|0\rangle$ case and the second qubit $b_1$ in the $|1\rangle$ case, requires disentangling the third qubit from the first two—a non-trivial operation—allowing its reuse in other parts of the computation. Quantum circuits that perform general, programmable quantum computations (as opposed to special-purpose computations) have not performed such reuse due to the relative expense of the disentangling operation.

This construction evidently may be extended to entangle "words" formed from multiple qubits. For example, FIG. 5 schematically shows a circuit for entangling two-qubit words (i.e., pairs of qubits) having states $|b_0\, b_1\rangle$ and $|b_2\, b_3\rangle$ using two C-Swap gates. The method is known to entangle larger words using similar constructions. Other entangling algorithms and/or circuits are known for a limited number of special cases (such as the customized entangling circuit proposed by Peter Shor in his famous paper describing quantum factorization of integers). However these constructions use quantum circuits which are tied to particular algorithms. Current generic methods for entangling qubits have a computational complexity that is so large as to negate the benefits of using quantum computation in the first place. A general, quantum algorithm-agnostic method for deterministically loading N classical data bits into a quantum state composed of an optimal $\text{Log}_2(N)$ data qubits, using an optimal $\text{Log}_2(N)$ gate depth, is therefore needed.

SUMMARY OF DISCLOSED EMBODIMENTS

Disclosed circuit embodiments deterministically load $N=2^n$ classical bits into an entangled quantum output state using an optimal gate depth of order $O(n)$. Loading is accomplished by dividing the $2^n$ input bits into data words (which may comprise one or more bits each according to the particular application), and entangling these data words using ancilla qubits. The output of the circuit consists of one data word and one or several index qubits, drawn from the ancilla, to select between the input data words. Entanglement of the data words is performed in a single time slice, while the number of sequential gates needed to produce the appropriate pre-entanglement quantum state in the ancilla, and to disentangle the non-output ancilla, has the desired order $O(n)$.

The general operation of an embodiment is as follows. First, an ancilla word of qubits is initialized, in several stages from a known state, to have a quantum state appropriate for entangling the input data words. Next, the ancilla word is entangled with the data words, so that all data words but one, and some number of the ancilla qubits, carry redundant information. Then the redundant qubits are disentangled.

Thus, a first embodiment is circuit for entangling quantum states of a plurality of at most $2^n$ input data qubits that are initially unentangled. The circuit comprises a plurality of ancilla qubits having an initially unentangled quantum state. The plurality of ancilla qubits is divided into first and second non-empty subsets, and the circuit provides as output qubits the second subset of ancilla qubits and a subset of the input data qubits. The circuit also includes a first stage of quantum gates configured to entangle the quantum states of the plurality of ancilla qubits according to a given entangled state. The circuit further includes a second stage of quantum gates configured to entangle, in parallel, the quantum state of each of the plurality of ancilla qubits with the quantum state of a corresponding pair of the data qubits. The circuit also has a third stage of quantum gates configured to disentangle the first subset of ancilla qubits from the output qubits.

In some embodiments, the first stage of quantum gates generates the given entangled state as a superposition of an all-zero state with an all-one state.

In some embodiments, each ancilla qubit in the plurality of ancilla qubits is used in at most order $O(n)$ quantum gates in the first stage of quantum gates.

In some embodiments, the first stage of quantum gates performs an ordered sequence of quantum operations and the third stage of quantum gates performs an initial portion of the reverse-ordered sequence of quantum operations.

In some embodiments, each ancilla qubit and each data qubit is used in exactly one quantum gate in the second stage of quantum gates.

In some embodiments, each ancilla qubit in the plurality of ancilla qubits is used in at most order $O(n)$ quantum gates in the third stage of quantum gates.

In some embodiments, the third stage of quantum gates comprises quantum gates for disentangling one or more data qubits from the ancilla qubits, and quantum gates for disentangling one or more ancilla qubits in the first subset of ancilla qubits from the input data qubits.

Some embodiments reuse discarded ancilla qubits, and include a first circuit for performing a first quantum computation using the output qubits, and further include a second circuit for performing a second quantum computation using the first subset of ancilla qubits without destroying the entanglement of the output qubits.

Some embodiments perform entanglement iteratively, and include a second entangling circuit according to claim 1, wherein the input data qubits of the second entangling circuit include the output qubits of the first entangling circuit.

In some iterative embodiments, the third stage of quantum gates in the second entangling circuit is configured to disentangle the first subset of ancilla qubits in the second entangling circuit from the output qubits of the second entangling circuit using a quantum state that is at least partially encoded in the first subset of ancilla qubits of the first entangling circuit.

A second embodiment is a method of entangling quantum states of a plurality of at most $2^n$ input data qubits that are initially unentangled. The method comprises providing a plurality of ancilla qubits having a given entangled state. The plurality of ancilla qubits is divided into first and second non-empty subsets. The method also comprises entangling, in parallel, the quantum state of each of the plurality of ancilla qubits with the quantum states of corresponding words formed from the input data qubits. The method further comprises disentangling the first subset of ancilla qubits from the second subset of ancilla qubits and the data qubits. The method then includes outputting the quantum state of the second subset of ancilla qubits and a word of the data qubits.

In some embodiments, providing the plurality of ancilla qubits having the given entangled state comprises generating a superposition of an all-zero state with an all-one state. Generating the given entangled state may include using each ancilla qubit in the plurality of ancilla qubits in at most order $O(n)$ quantum gates. Alternately or in addition, generating the given entangled state may include performing an ordered sequence of quantum operations and disentangling includes performing an initial portion of the reverse-ordered sequence of quantum operations.

In some embodiments, entangling the quantum state comprises using each ancilla qubit and each data qubit in exactly one quantum gate.

In some embodiments, disentangling comprises using each ancilla qubit in the plurality of ancilla qubits in at most order O(n) quantum gates.

In some embodiments, disentangling the first subset of ancilla qubits from the second subset of ancilla qubits and the data qubits comprises disentangling one or more data qubits from the ancilla qubits, and disentangling one or more ancilla qubits in the first subset of ancilla qubits from the input data qubits.

Some embodiments reuse discarded ancilla qubits, and include performing a first quantum computation using the output qubits, and performing a second quantum computation using the first subset of ancilla qubits without destroying the entanglement of the output qubits.

Some embodiments perform entanglement iteratively by performing the method a plurality of times, wherein the input data of each performance except the first performance comprises the output data of the immediately preceding performance.

In some such embodiments, in each performance except the first, disentangling the first subset of ancilla qubits from the second subset of ancilla qubits and the data qubits comprises using a quantum state that is at least partially encoded in the qubits disentangled by the immediately preceding performance.

It is appreciated that a person having ordinary skill in the art may perceive other ways to embody the concepts, techniques, and structures disclosed herein without departing from their teachings.

DESCRIPTION OF THE SEVERAL VIEWS OF THE DRAWINGS

The manner and process of making and using the disclosed embodiments may be appreciated by reference to the drawings, in which:

FIG. 2 schematically shows, using quantum circuit notation, parallel loading of N bits of classical data into a quantum computer;

FIGS. 3 and 3A schematically show an uncontrolled quantum swap gate that always interchanges the quantum states of two qubits;

FIG. 4 schematically shows a quantum circuit for entangling two qubits using a controlled swap ("C-Swap") gate;

FIG. 5 schematically shows a quantum circuit for entangling a pair of two-qubit "words" using two C-Swap gates;

DETAILED DESCRIPTION

In this specification, including the appended claims, the following quoted terms shall have the indicated meanings, except where expressly indicated otherwise:

A "binary digit" or "bit" is the memory storage unit used by a classical computer to store classical data and holds precisely the amount of information required to answer a single, unambiguous yes-or-no question.

A "quantum bit" or "qubit" is the memory storage element used by a quantum computer to store quantum data and has a state that may be represented by a point inside, or on the surface of, a ball of unit radius sitting in a three-dimensional real space, called the "Bloch sphere".

"Gate depth" of a quantum circuit, having an input and an output, means the maximum number of quantum gates in the circuit through which any input qubit state must pass before it becomes part of an output qubit state.

To solve the problems in the prior art identified above, the loading circuit gate depth must obey bounds compatible with the quantum algorithm to be implemented. For an exponential speedup over a classical polynomial complexity algorithm, the data loading circuit depth must scale at most polylogarithmically as, in order notation, $O(Log_2(N))$. In what follows, without loss of generality for asymptotic calculations, let N be a power of 2 and define n such that $N=2^n$. A quantum circuit that solves the loading problem is now described in detail in connection with FIGS. 6-11.

Figure 1:
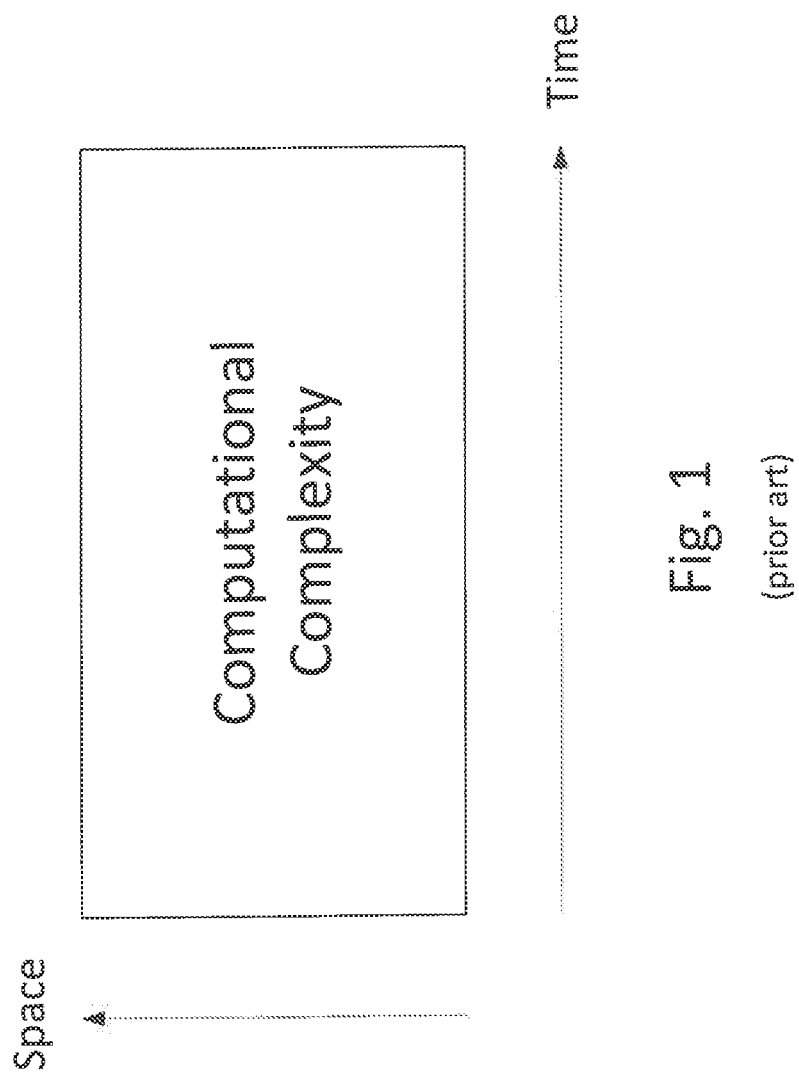
FIG. 1 schematically shows computational complexity as a function of time and space.
Figure 6:
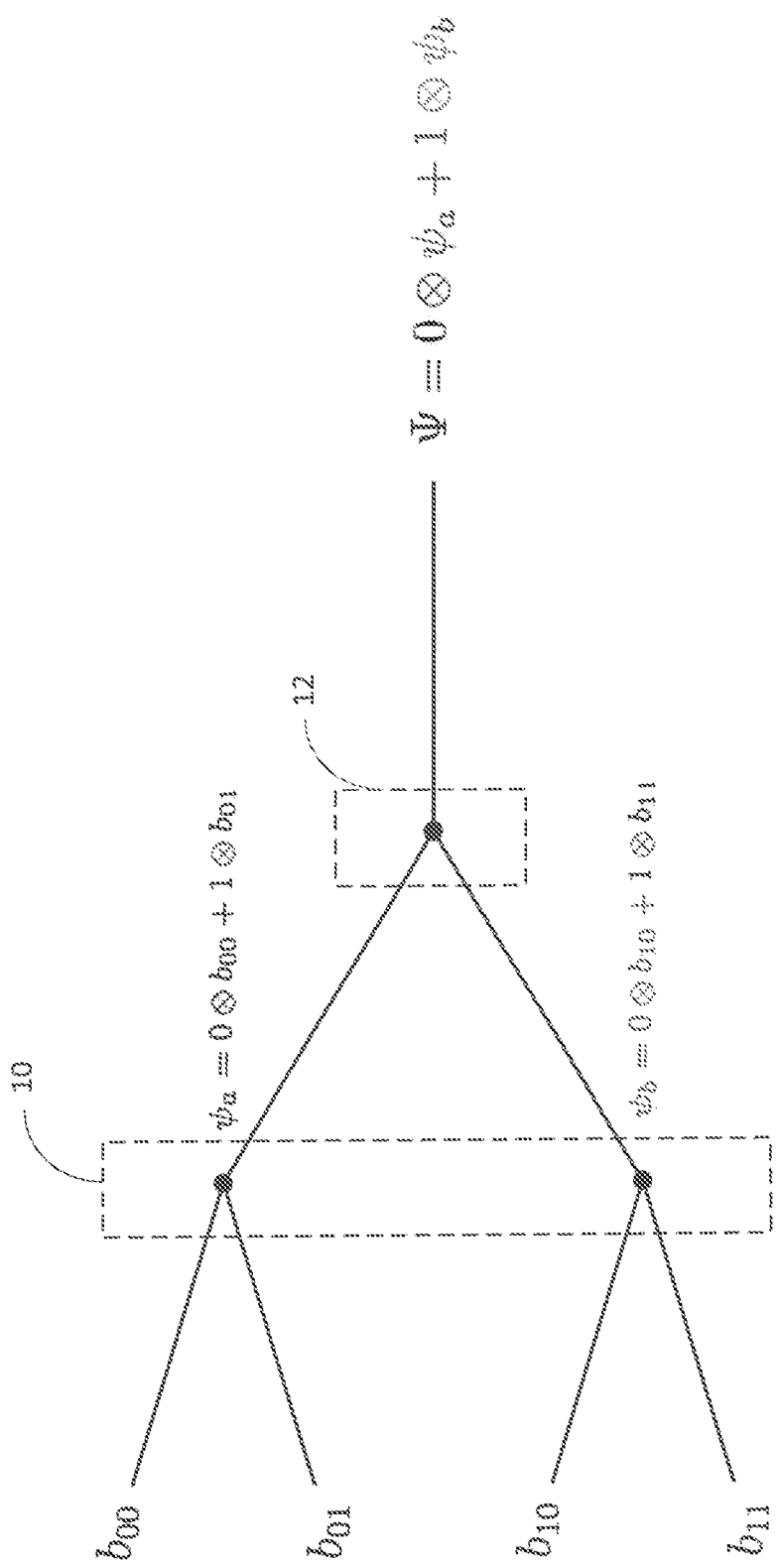
FIG. 6 schematically conceptually shows recursive assembly of two, two-qubit words of data into a three-qubit entangled state $\psi$.

FIG. 6 schematically shows conceptual recursive assembly of a quantum state $\psi$ from N=4 qubits (i.e. n=2) representing classical bits $b_{00}$, $b_{01}$, $b_{10}$, and $b_{11}$ using a recursion of depth two according to an embodiment. In the first logical stage 10, the qubits having states $|b_{00}\rangle$ and $|b_{01}\rangle$ are combined (e.g. using a two-qubit entangling circuit as in FIG. 4) to produce an intermediate state $\psi_a = |0\ b_{00}\rangle + |1\ b_{01}\rangle$. Also in the first logical stage 10, the qubits having states $|b_{10}\rangle$ and $|b_{11}\rangle$ are similarly combined to produce an intermediate state $\psi_b = |0\ b_{10}\rangle + |1\ b_{11}\rangle$. In the second logical stage 12, the two intermediate states $\psi_a$ and $\psi_b$ are combined (e.g. using a two-qubit word entangling circuit as in FIG. 5) to produce the final combined quantum state $\psi = |0\ 0\ b_{00}\rangle + |0\ 1\ b_{01}\rangle + |1\ 0\ b_{10}\rangle + |1\ 1\ b_{11}\rangle$ as indicated.

This final quantum state may be thought of as having an "index" qubit (0 or 1) and two "data" qubits representing a two-qubit entangled "word" indexed by the index qubit; that is, the quantum word $|0\ b_{00}\rangle + |1\ b_{01}\rangle$ for index 0 and $|0\ b_{10}\rangle + |1\ b_{11}\rangle$ for index 1, as indicated in FIG. 6. Alternately, the final quantum state may be thought of as having two index qubits (00, 01, 10, or 11) and one data qubit representing a one-qubit word (i.e., $b_{00}$ for index 00, and so on). These conceptualizations are provided only for the benefit of the reader, and it is appreciated that they do not affect the operation of embodiments described herein.

Figure 7:
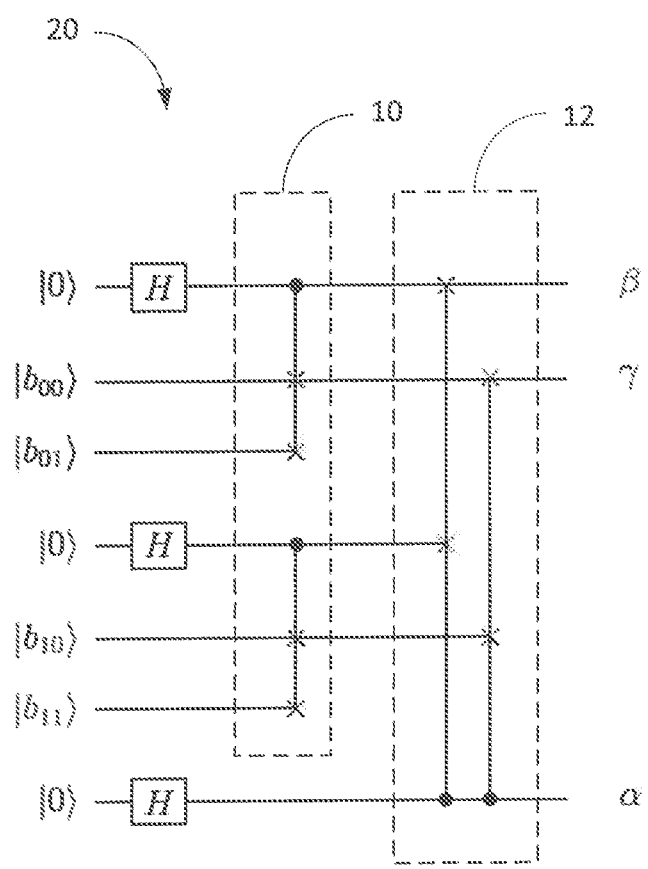
FIG. 7 schematically shows a quantum circuit embodiment that recursively implements a four bit superposition quantum state according to the assembly of FIG. 6.

FIG. 7 schematically shows a circuit 20 for performing the recursive assembly of an entangled quantum state in accordance with an embodiment of FIG. 6. The circuit 20 includes two copies of the circuit of FIG. 4 to perform first stage 10 entanglement of the qubit states $|b_{00}\rangle$ and $|b_{01}\rangle$ via C-Swap, and entanglement of the qubit states $|b_{10}\rangle$ and $|b_{11}\rangle$ via C-Swap. Thus, after first stage 10 processing, the following obtain: (a) the first and second qubits from the top of FIG. 7 encode the intermediate state $\psi_a$, (b) the third qubit may be discarded (as indicated by termination of its horizontal "time" line), (c) the fourth and fifth qubits encode the intermediate state $\psi_b$, and (d) the sixth qubit may be discarded.

The second stage 12 is implemented, as discussed above in connection with FIG. 6, using a seventh (ancilla) qubit to control a pairwise entanglement between states $\psi_a$ and $\psi_b$ via the circuit design of FIG. 5. The seventh qubit, unused in first stage 10 processing, has the quantum state $|0\rangle+|1\rangle$ after the Hadamard gate. Thus, after second stage 12 processing: (a) the first, second, and seventh qubits encode the state $\psi=|\alpha\beta\gamma\rangle$ of the logical circuit of FIG. 6, with $|\alpha\rangle$ the index qubit and $|\beta\gamma\rangle$ the data word, and (b) the fourth and fifth qubits may be discarded.

Disentangling and Reusing Qubits

Ideally one would like to reuse discarded qubits later in the computation. However the discarded qubits typically are entangled with other qubits in the circuit, complicating the reuse of the discarded qubits in other circuit blocks. Thus, consider the problem of disentangling a data bit from the output of a single C-Swap gate, for example as found in FIG. 4. Ideally, one would like to see the final circuit quantum state be $$|q_1 q_2 q_3\rangle = (|0 b_0\rangle + |1 b_1\rangle) \otimes |junk\rangle$$

where the third qubit|junk⟩ is disentangled from the two qubit state $|0 b_0\rangle+|1 b_1\rangle$. Then given that the single qubit junk state $|junk\rangle$ is in a tensor product with the remaining two qubit state$|q_1 q_2\rangle$, the junk state in qubit $q_3$ can be removed without affecting the state $|q_1 q_2\rangle$. The junk state can be reused as an ancilla or in some other role later in the computation without fear of impacting earlier completed computational operations.

The removal and reuse of the junk qubit can occur even if there are classical correlations between the junk state $|junk\rangle$ and the state$|q_1 q_2\rangle$. While entanglement between $|junk\rangle$ and $|q_1 q_2\rangle$ would allow a manipulation of $|junk\rangle$ to affect the state of $|q_1 q_2\rangle$, correlations do not. The qubit reuse scenario requires post-processing of qubit $q_3$ so that measuring $q_3$ will not impact the remaining $|q_1 q_2\rangle$ superposition state, leaving $|q_1 q_2\rangle$ in the state $|0 b_0\rangle+|1 b_1\rangle$ regardless of the measurement outcome of $q_3$.

Figures 8, 9:
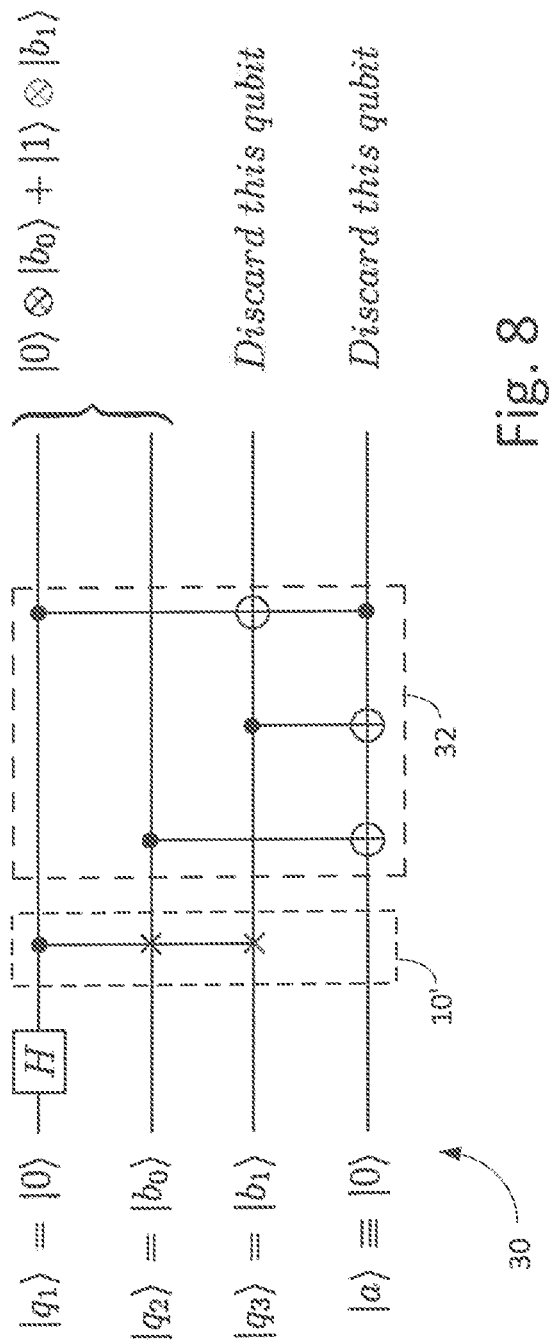
FIG. 8 schematically shows a quantum circuit for disentangling qubits according to an embodiment.
FIG. 9 is a table listing quantum states of each of the qubits in FIG. 8 during disentangling.

Thus, FIG. 8 schematically shows a quantum circuit 30 for disentangling qubit $q_3$. The circuit 30 includes a first stage 10' that entangles two data qubits $b_0$ and $b_1$. The first stage 10' may be, for example, a portion of the first stage 10 of the embodiment of FIG. 7. The circuit 30 also includes a disentangling stage 32, which uses an additional ancillary qubit with state $|a\rangle$ to disentangle qubit $q_3$ from the output, so that this qubit may be reused. The disentangling stage 32 includes two controlled-NOT (CNOT) quantum gates and a controlled-controlled-NOT (CCNOT or Toffoli) gate as shown. It is appreciated that other quantum circuitry to disentangle one of the input qubits from the output may be used.

The mathematical operation F of the disentangling stage 32 may be appreciated by referring to FIG. 9, which is a table listing quantum states of each of the qubits in FIG. 8 before and after disentanglement. The first and second columns of the table indicate the possible values of the input bits $b_0$ and $b_1$. The third column indicates the input quantum state $|q_1 q_2 q_3 a\rangle$, where $|a\rangle$ represents the quantum state of an ancilla qubit introduced for disentanglement. The input state is $|0 b_0 b_1 0\rangle$, as shown.

The fourth column indicates the quantum state after the first stage 10 but prior to the disentanglement stage 32. As may be understood through reference to the circuit 30, this value is $\psi=|0 b_0 b_1 0\rangle+|1 b_1 b_0 0\rangle$. That is, the Hadamard gate gives the first qubit $q_1$ the state $|0\rangle+|1\rangle$, and this value controls the C-Swap of the second and third qubits $q_2$ and $q_3$ whose initial quantum state was $|b_0 b_1\rangle$, while the ancilla qubit is unmodified.

The fifth column indicates the quantum state after the operation of the disentangling stage 32. The goal of the disentangling stage is to produce, in the qubit $q_3$, a quantum state that is independent of the state $|q_1 q_2\rangle$. The first CNOT gate produces the intermediate quantum state $\psi=|0 b_0 b_1 b_0\rangle+|1 b_1 b_0 b_1\rangle$. The second gate, also a CNOT, produces the state $\psi=(|0 b_0 b_1\rangle+|1 b_1 b_0\rangle)\otimes(|b_0 \oplus b_1\rangle)$. This state sets the value of the ancilla qubit equal to the exclusive or of the two bits $b_0$ and $b_1$, so that $|a\rangle$ once again is disentangled from $|q_1 q_2 q_3\rangle$ but now has a useful value. The final gate, a CCNOT, flips the third qubit $q_3$ precisely when $q_1=a=1$. Tracing through the Boolean logic shows that this has the effect of setting $q_3$ equal to $b_1$, so the final state is $\psi=(|0 b_0\rangle+|1 b_1\rangle)\otimes|b_1\rangle\otimes(|b_0\oplus b_1\rangle)$, as expanded in the fifth column of FIG. 9. As the value of $|q_3 a\rangle$ is independent of the desired output state $|0 b_0\rangle+|1 b_1\rangle$, the disentangled qubits $q_3$ and a now may be discarded.

It is appreciated that any or all the C-Swap gates present in the circuit of FIG. 7 advantageously may be coupled to the disentangling circuit of FIG. 8, or a similar disentangling circuit, to reduce the number of qubits required in the quantum computer, or to permit some or all the qubits to be reused in other parts of the quantum computer.

Entangling Multiple Words Using Multiple Index Ancillae

Figure 10:
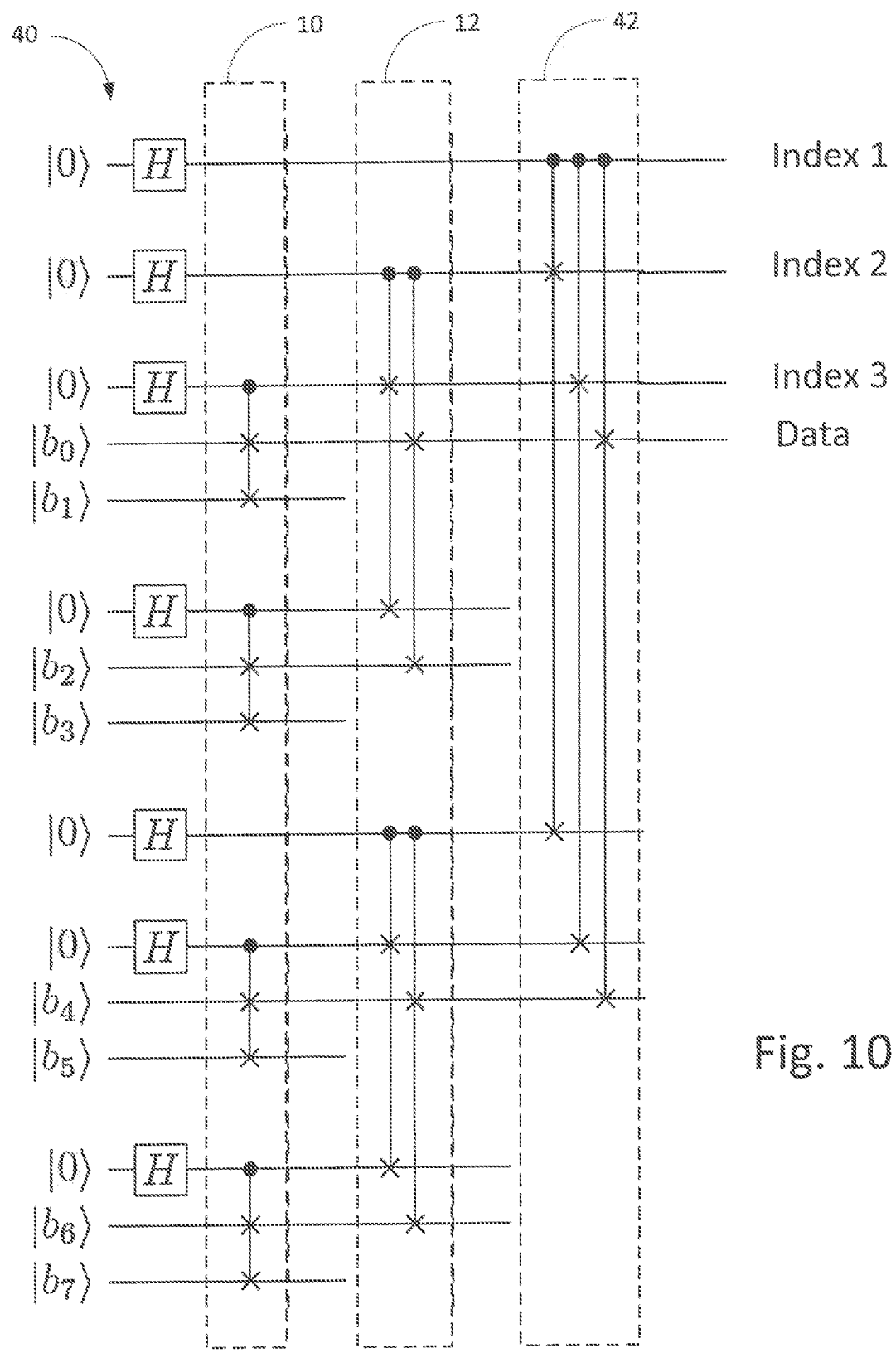
FIG. 10 schematically shows a quantum circuit according to an embodiment for assembling eight bits of classical data into four entangled qubits.

The circuit of FIG. 7 advantageously generalizes to entangle even more input qubit states in a straightforward manner. FIG. 10 schematically shows a circuit 40 according to an embodiment for forming N=8 bits of classical data into n=3 entangled "index" qubits plus one "data" qubit. In FIG. 10, the disentangling stages are omitted for clarity. Thus, the first two stages 10, 12 of circuit 40 are identical to those of FIG. 7, duplicated to accommodate more input bits, while the third stage 42 of circuit 40 performs three C-Swap operations to produce the final output. In this way, the eight input qubits $b_0$ through $b_7$ are entangled in $\log_2(8)=3$ stages. Generally, loading $2^n$ classical bits will require n stages.

Recursive assembly of the final quantum state $\psi$ shown in FIGS. 6 through 10 may be extended in an obvious way to larger values of N (and n), and such extended circuits will have n stages. However, it is appreciated that the number and complexity of the quantum gates used to implement such an assembly increases correspondingly with each stage. For example, while the first stage 10 combines one-qubit words, the second stage 12 combines two two-qubit words, requiring more a complicated gate structure. Thus, further detail is required with respect to the actual circuit design to assure that the gate depth does not increase exponentially as the number of stages increases, thereby negating the advantage of using quantum computation.

The gate depth of the generalized circuit according to these techniques is computed as follows. Moving from left to right in FIG. 10, the first layer requires one C-Swap operation (four times in parallel). The second layer requires two C-Swap operations (twice in parallel). The third layer requires three C-Swap operations. Generalizing, the k-th layer requires k (parallelized) C-Swap operations. Analyzing the number of operations in these recursion layers leads to a total number of C-Swap gates in the general case of n stages that is equal to n(n+1)/2. Thus, the gate depth, i.e. the maximum number of gates through which a quantum state must pass from input to output, has order $O(n^2)$. One may likewise show that the number of physical gates has order $O(n^2)$.

The total gate depth is proportional to time. An order proportional to $n^2$ is acceptable, but not ideal, for an exponential speedup quantum algorithm. Ideally, one would like a theoretical gate depth that scales as $O(n)$, so that input data of arbitrary size may be loaded into a quantum computer as rapidly as possible.

Figure 11:
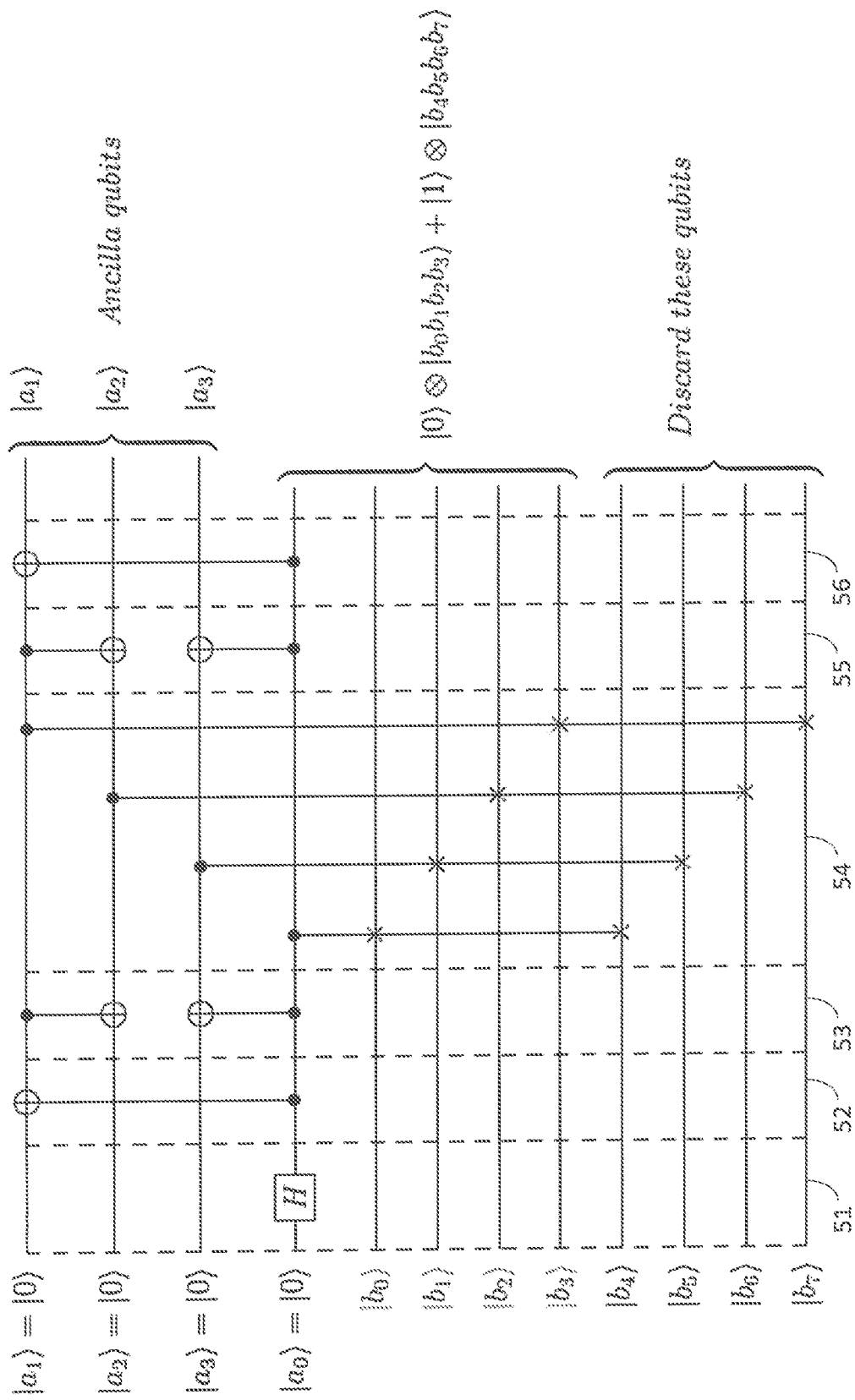
FIG. 11 schematically shows a quantum circuit according to an embodiment for assembling two four-bit words of classical data into five entangled qubits with reduced gate depth.

FIG. 11 schematically shows a circuit 50 according to an embodiment for assembling two four-bit words of data into five entangled qubits with reduced gate depth. The words of data may represent classical bits or, more generally and advantageously, any words formed from unentangled qubits. Like FIG. 10, the circuit 50 converts eight input qubits into an output entangled state. Unlike FIG. 10, whose output state consists of a one-qubit word entangled with three index qubits, the output state of circuit 50 consists of two four-qubit words entangled with one index qubit. Thus, the encoding provided by the entanglement of FIG. 10 is more qubit-efficient than that of FIG. 11, but provides a data word usable for computation that is only one-qubit in width. It is appreciated that various quantum computer designs may require computation words of different widths.

Advantageously, the circuit 50 (when generalized) has a gate depth of order $O(n)$. This fact may be appreciated by considering the design of the circuit 50, for which n=3. The circuit 50 includes four ancilla qubits labeled $a_0$ through $a_3$—one for each classical bit $|b_1\rangle$ in the width of the data words to be entangled. That is, circuit 50 includes an ancilla "word" of qubits. The first such qubit $a_0$ is output as the index qubit entangling the data words $|b_0 b_1 b_2 b_3\rangle$ and $|b_4 b_5 b_6 b_7\rangle$.

It is appreciated that the circuit 50 may be generalized without undue experimentation to circuits whose word width is other than 4 bits (or qubits). It also is appreciated that the circuit 50 may be generalized without undue experimentation to circuits that superpose more than two output data words (for example, the circuit in FIG. 7 superposes 8 one-bit words using 3 output index qubits). It is further appreciated that, because FIG. 11 is merely illustrative, a person having ordinary skill in the art may understand how to provide quantum circuitry that performs the entangling and/or disentangling functions of the circuit 50 with a gate depth of order $O(n)$ but without departing from the scope of an invention claimed herein.

The circuit 50 has six stages 51 to 56, each of which is performed in a single time slice. In general, stages 51-53 form a first, combined stage of quantum gates to entangle the quantum states of the plurality of ancilla qubits according to a given entangled state, namely $|0\ 0\ 0\ 0\rangle + |1\ 1\ 1\ 1\rangle$ (a so-called "cat" state, named for the famous thought experiment of Schrödinger). Stage 54 is a highly-parallel second stage of quantum gates configured to entangle, in one time slice, the quantum state of each of the plurality of ancilla qubits $a_0$ to $a_3$ with the quantum state of a corresponding pair of the data qubits. Stages 55-56 form a third, combined stage of quantum gates configured to disentangle the first subset of ancilla qubits from the second subset of ancilla qubits and the data qubits. The output of the circuit 50 is then the fourth through eighth qubits from the top of the Figure, as shown. Each stage is now described in detail.

In stage 51, a single Hadamard operation is performed, producing the quantum state $|a_0\ a_1\ a_2\ a_3\rangle = |1\ 0\ 0\ 0\rangle + |1\ 1\ 0\ 0\ 0\rangle$. In stage 52, the value in $a_0$ is used to control negation of $a_1$, producing $|a_0\ a_1\ a_2\ a_3\rangle = |1\ 0\ 0\ 0\rangle + |1\ 1\ 0\ 0\rangle$. In stage 53, the values in $a_0$ and $a_1$ are used to control negation of $a_3$ and $a_2$ respectively, producing $|a_0\ a_1\ a_2\ a_3\rangle = |1\ 0\ 0\ 0\rangle + |1\ 1\ 1\ 1\rangle$. It is appreciated that this technique may be generalized to produce, after m+1 stages (and a corresponding gate depth of m+1 for qubit $a_0$), an m-qubit quantum cat state $$|a_0 a_1 \ldots a_{2^m-1}\rangle = |0\ 0\ \ldots\ 0\rangle + |1\ 1\ \ldots\ 1\rangle$$

for entangling two data words of width $2^m$. Based on the above description, one of ordinary skill in the art should appreciate other desired quantum states to entangle more than two data words of a given width, and how to produce such desired quantum states in the ancilla qubits in stages having logarithmic order number with respect to the input data size.

In stage 54, four C-Swap operations are performed in parallel, producing the desired output state $\psi = |0\ b_0\ b_1\ b_2\ b_3\rangle + |1\ b_4\ b_5\ b_6\ b_7\rangle$ in qubits 4 through 8. Physical parallelization of these operations, for advantageous performance in a single time slice while adding only a single gate to the overall depth, is enabled through use of the ancilla qubits, since each C-Swap is performed on a different triplet of qubits. In general, if the data word size is $2^m$ qubits, then the number of parallel C-Swap operations in stage 54 is $2^m$.

Stages 55 and 56 decouple the ancilla qubits $a_1$ to $a_n$ by performing the operations of stages 51 and 52 in reverse order. Thus, stage 55 produces the quantum state $|a_0\ a_1\ a_2\ a_3\rangle = |0\ 0\ 0\ 0\rangle + |1\ 1\ 0\ 0\rangle$, while stage 56 produces the quantum state $|a_0\ a_1\ a_2\ a_3\rangle = |0\ 0\ 0\ 0\rangle + |1\ 0\ 0\ 0\rangle = |a_0\rangle \otimes |0\ 0\ 0\rangle$. The quantum state of $a_0$ is retained because this qubit is used in the desired output, but ancilla qubits $a_1$ to $a_n$ are reset to their initial states. These ancilla qubits already are disentangled from the final output (and re-initialized), and therefore may be reused immediately in other parts of the quantum computer.

Four of the remaining qubits (i.e. those from one of the input data words) may be discarded. In FIG. 11, these are the qubits $b_4$ through $b_7$. Discarding these qubits may be accomplished, for example, using disentangling stages, as described above in connection with FIGS. 8 and 9. Advantageously, the discarding process may be performed in parallel with the disentangling stages 55 and 56, reducing the overall gate depth of the discarded qubits.

As noted above, the gate depth of a generalized circuit 50 has order $O(n)$. This is because m≤n initial stages are required to produce the desired quantum state in the ancilla qubits, and m−1 final stages are required to disentangle the ancilla qubits $a_1$ to $a_{2^m-1}$. Thus, the total number of stages (and total gate depth) for loading is equal to 2m, a vast improvement over the prior art.

Disentangling Qubits Throughout Multiple Stages

The concepts, techniques, and structures disclosed herein, especially the operation of the central, single-time-slice stage 54 of FIG. 11, may be used sequentially in a multi-stage entangling process. That is, referring back to FIGS. 6 and 7, these techniques may be used in a first entangling stage 10 (e.g. on single qubits to entangle them as words), then again in a second entangling stage 12 (e.g. to entangle the words). It is appreciated that the concepts, techniques, and structures described herein may be readily generalized beyond the two-stage design just described to other designs that have more stages, or assign different semantic meanings to the input qubits, or entangle input qubits in different orders to produce the output states, or are used for a variety of other, general purposes, including transforming arbitrary input quantum states into desired entangled output states for use in generalized quantum computation or annealing.

The corresponding disentangling operations, however, become more complex as one progresses from the first stage through subsequent stages due to the greater number of entangled qubits appearing in the output of each stage. Thus, while the circuit and techniques described in connection with FIGS. 8 and 9 may be used to disentangle and reuse qubits in the first entanglement stage (e.g. the third and sixth qubits after stage 10 of FIG. 7), more involved techniques are required to disentangle the ever-more entangled quantum states that appear in later stages of a multi-stage entanglement (e.g. the fourth and fifth qubits after stage 12 of FIG. 7).

To solve this problem, the techniques of FIGS. 8 and 9 may be extended in a simple, iterative manner to remove multiple discarded qubits, such as those marked for discarding in FIG. 11. Entanglements between a discarded qubit and non-discarded qubits may be thought of as layers of an onion, and the iterative disentangling process may be thought of as peeling those layers back: each iteration disentangles one discarded qubit from all of the other qubits.

In particular, after the operation of the circuitry of FIG. 8 (with quantum state transformations as indicated in FIG. 9) the state of the disentangled qubits encodes the output state. That is, measuring the two discarded qubits indicates which of the four values of $\{b_0, b_1\}$ were loaded into the two output qubits. Consequently, the values encoded in the discarded qubits may be "carried forward" for computational reuse in disentangling qubits at the next stage without destroying the superposition of the output qubits of the first stage, precisely because the circuitry of FIG. 8 disentangles the discarded qubits from the output qubits.

Figure 12:
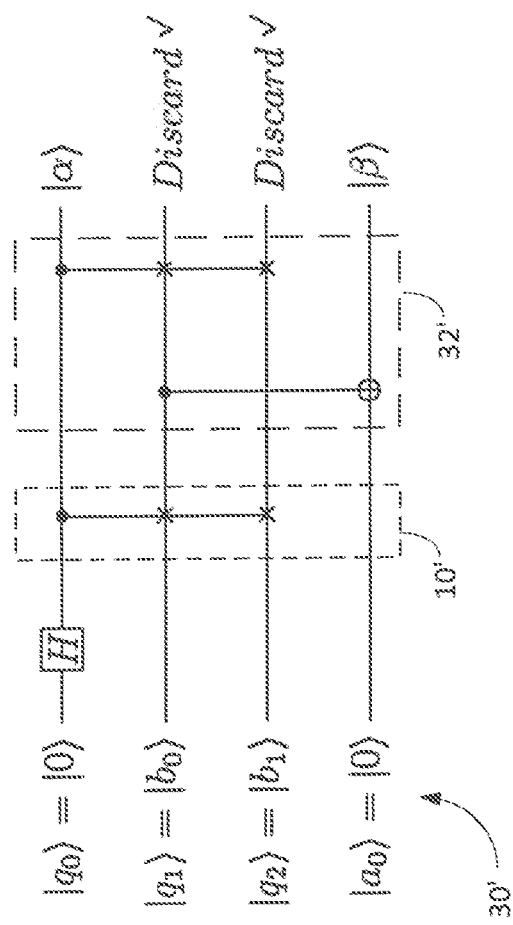
FIG. 12 schematically shows a quantum circuit for disentangling qubits according to an embodiment having two input data qubits.
Figure 13:
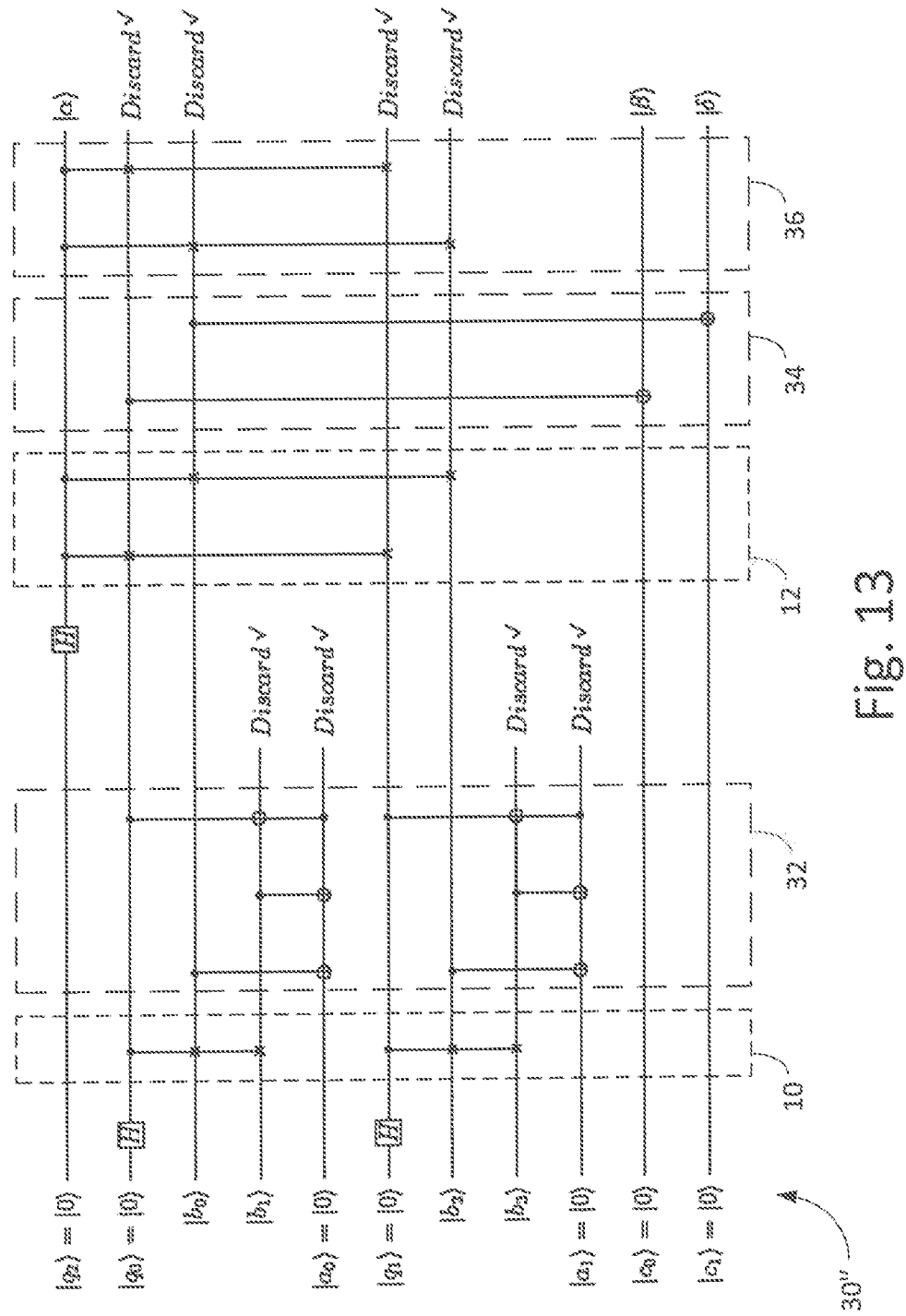
FIG. 13 schematically shows an extension of the concepts, structures, and techniques of FIG. 12 to an embodiment having four input data qubits.
Figure 14:
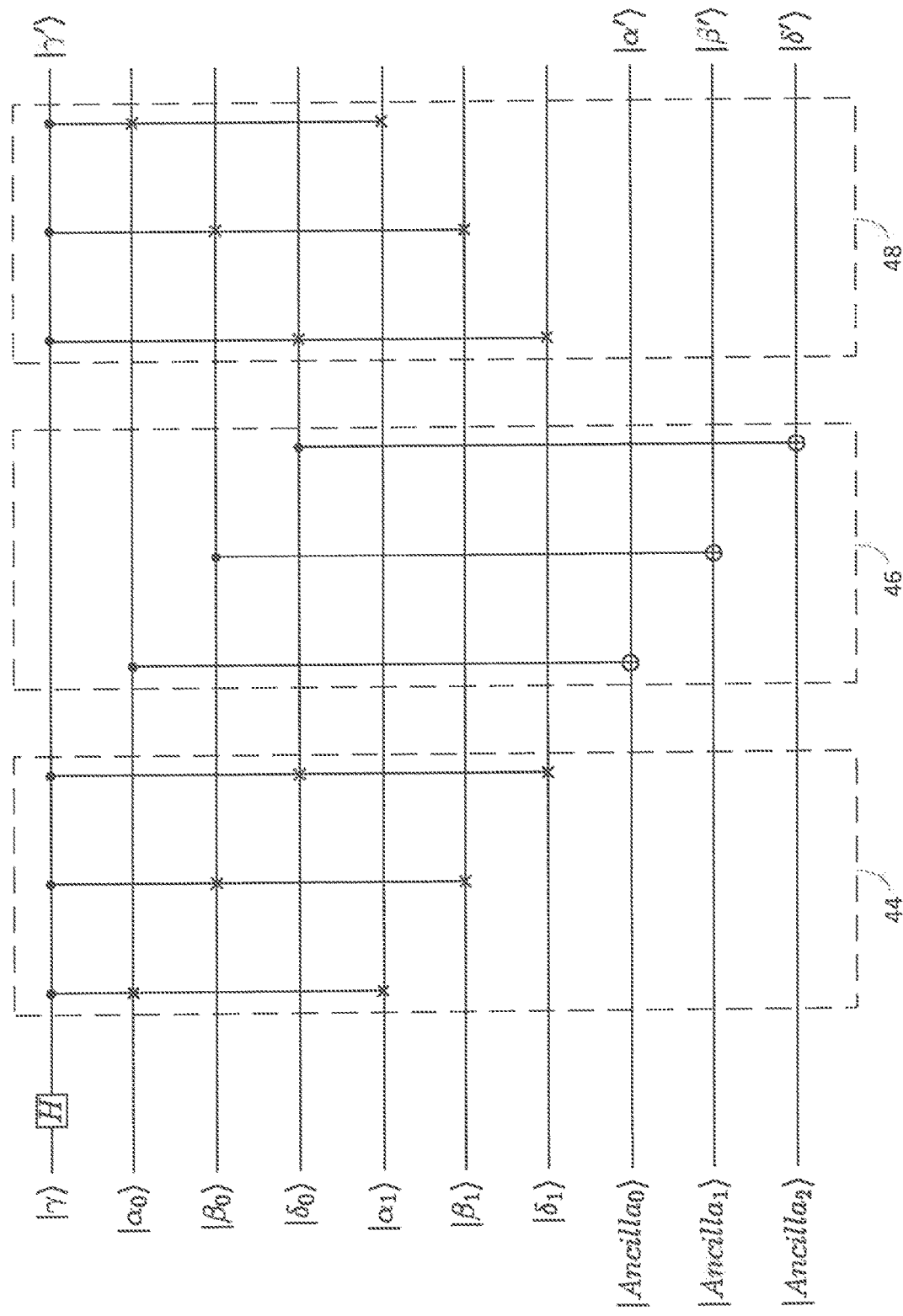
FIG. 14 schematically shows an extension of the concepts, structures, and techniques of FIG. 12 to an embodiment having six input data qubits in two words of three qubits each.

These concepts are illustrated in FIGS. 12, 13, and 14. FIG. 12 schematically shows a quantum circuit 30' for disentangling qubits according to an embodiment having two input data qubits $q_1$ and $q_2$. It is appreciated that the disentangling circuit of FIG. 12 is merely an alternate arrangement for achieving the same result as the disentangling circuit 30 of FIG. 8, and is presented to illustrate a circuit arrangement that is readily generalized to disentangle qubits having more complicated entangled states.

The circuit 30' of FIG. 12 has an elegant interpretation. As in the circuit 30 of FIG. 8, one constructs the desired superposition state using the Hadamard and controlled swap gate 10'. However, in FIG. 12 one "copies out" of the circuit into an ancilla qubit $a_0$ the desired superposition state, then runs the original superposition circuit 10' in reverse, as implemented here by the circuitry 32'. The result of the final controlled swap gate is to disentangle qubits $q_1$ and $q_2$ from α and β.

In terms of state transitions, after the first controlled swap gate 10', the 4 qubit circuit state is $|0\ b_0\ b_1\ 0\rangle + |1\ b_1\ b_0\ 0\rangle$. After the controlled not (CNOT) gate, the state is $|0\ b_0\ b_1\ b_0\rangle + |1\ b_1\ b_0\ b_1\rangle$. Finally, after the second controlled swap gate, the output state is $|0\ b_0\ b_1\ b_0\rangle + |1\ b_0\ b_1\ b_1\rangle$. As may be plainly seen, the second and third qubits always have the state $|b_0\ b_1\rangle$, and are therefore disentangled from the first and fourth qubits that carry the desired output state $|0\ b_0\rangle + |1\ b_1\rangle$.

One advantage of the circuit shown in FIG. 12 is that the "copying out" concept readily generalizes to multiple entangling levels in the data loading tree. Thus, FIG. 13 schematically shows an extension of the concepts, structures, and techniques of FIG. 12 to an embodiment 30" having four input data qubits. In accordance with these concepts, and remembering the multi-level application shown in FIG. 6, the circuit embodiment 30" provides a two-level entangling and disentangling function having a gate depth computational complexity for disentangling qubits of order O(n).

The circuit 30" shown in FIG. 13 applies the desired disentangling operation for the second level of the data loading assembly tree, and operates as follows. Initially, the first stage of the entangling operation proceeds as in the first stage 10 of FIG. 7, where the four input data qubits are separately entangled to form two, two-bit data words. Next, as in the second stage 32 of FIG. 8, the qubits not necessary to pass on to the next stage of processing are disentangled. It is appreciated that the disentangling process after the first entangling process may be performed in a variety of methods and with a variety of circuits (such as circuits 32 of FIG. 8 and 32' of FIG. 12), and the circuits disclosed herein merely illustrate possible ways to perform disentanglement with a gate depth of order O(n). Thus, for example, the entangling stage 10 of FIG. 7 may be combined with the disentangling stage 32 of FIG. 8 with the expected operation and functionality.

Referring back to FIG. 13, the desired output superposition state is constructed in the third stage 12, which performs the second-level entanglement described above in connection with FIG. 7. The fourth block 34 starts with two controlled not (CNOT) gates to "copy out" the relevant superposition data, which generalizes the process described above in connection with the circuit of FIG. 12. The remaining two controlled swap (CSwap) gates in the fifth block 36 serve to unwind the superposition generated by the third block. The Hadamard (H) gate just prior to the third block 12 is irrelevant to the unwinding process in the fifth block 36, but may be included if desired and without any loss of generality.

To help trace the circuit transformations, the sequence of quantum states is now tabulated for blocks 34 and 36. The state of the seven qubits present in the second entanglement/disentanglement stage (that is, the first, second, third, sixth, seventh, tenth, and eleventh from the top) after the second entanglement block 12 and just prior to the block 34 is $$0 \otimes (0b_0+1b_1) \otimes (0b_2+1b_3) \otimes 0 \otimes 0 + 1 \otimes (0b_2+1b_3) \otimes (0b_0+1b_1) \otimes 0 \otimes 0$$

The state of these seven qubits after the "copying out" block 34 is $$0 \otimes (0b_0+1b_1) \otimes (0b_2+1b_3) \otimes (0b_0+1b_1) + 1 \otimes (0b_2+1b_3) \otimes (0b_0+1b_1) \otimes (0b_2+1b_3)$$

The state of these seven qubits after the unwinding/disentangling block 36 is $$0 \otimes (0b_0+1b_1) \otimes (0b_2+1b_3) \otimes (0b_0+1b_1) + 1 \otimes (0b_0+1b_1) \otimes (0b_2+1b_3) \otimes (0b_2+1b_3)$$

To explain the structure of this latter quantum state more clearly, let the non-output ("junk") quantum state be written $\psi = (0b_0+1b_1) \otimes (0b_2+1b_3)$. Then the last quantum state above can be rewritten as $0 \otimes \psi \otimes (0b_0+1b_1)+1 \otimes \psi \otimes (0b_2+1b_3)$ It may be seen from this representation that the non-output quantum state ψ and the desired, final output state are disentangled. Thus, one may use only the first, tenth, and eleventh qubits to provide the final, three-qubit superposition, output state $|q_2,c_0,c_1\rangle = |\alpha,\beta,\delta\rangle = 0 \otimes (0b_0+1b_1)+1 \otimes (0b_2+1b_3)$
$= 00b_0+01b_1+10b_2+11b_3).$ This approach generalizes directly to implementations with k levels (for some number k). Generic implementations of the "copying out" block 34 can be done in parallel, as they involve different qubits, and may be shown to require k different CNOT gates. Thus, the CNOT gates for a generic implementation, regardless of which level they appear at, contribute a gate depth of only 1. Likewise, implementations of the unwinding or disentangling block 36 may consist (as shown in FIG. 13, for example) of k CSwap gates. Thus, the disentangling operations serve to double the overall depth of a circuit lacking these operations. As is known in the art, doubling does not change complexity order, so with or without disentangling, the overall data loading circuit depth advantageously remains O(n).

As a further example of these concepts, techniques, and structures, FIG. 14 schematically shows an embodiment having six input data qubits in two words of three qubits each. Its operation may be perceived by reference to these techniques. Thus, the first three quantum gates 44 (CSwaps) perform the initial entanglement. The next three quantum gates 46 (CNOTs) perform the "copying out" to the ancilla qubits, and may operate in a single time slice. Finally, the last three quantum gates 48 (CSwaps again) unwind or disentangle the non-output data qubits. Thus, the circuit of FIG. 14 outputs the four qubit state $|\gamma'\ \alpha'\ \beta'\ \delta'\rangle$ in the first, eighth, ninth, and tenth qubits from the top that represents an entanglement of the two, three-qubit input data words.

Figure 15:
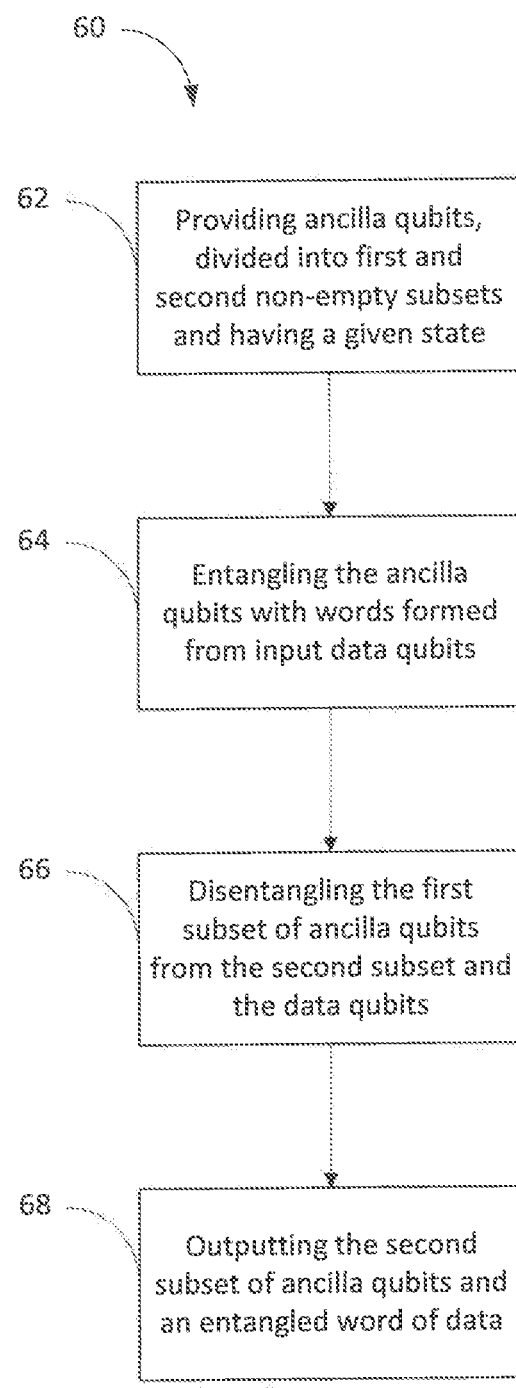
FIG. 15 is a flowchart showing processes in a method of entangling quantum states in accordance with an embodiment of the concepts and techniques described herein.

The above-described concepts and techniques are reiterated in FIG. 15, which is a flowchart showing processes in a method 60 of entangling quantum states in accordance with an embodiment of the concepts and techniques described herein.

A first process 62 provides a plurality of ancilla qubits having a given entangled state. As described above in connection with FIG. 11, the ancilla qubits may be (conceptually) numbered $a_0$ through an and the given entangled state may be a "cat state" (i.e. $|0\ 0\ \ldots\ 0\rangle + |1\ 1\ \ldots\ 1\rangle$) or some other desired state. The plurality of ancilla qubits is divided into first and second non-empty subsets. The first subset represents qubits that do not undergo swap operations and that form no part of the output quantum state, while the second subset represents qubits that undergo a swap operation and do form part of the output. Entanglement may be performed with a gate depth of at most n.

A second process 64 entangles the ancilla qubits with words formed from the input data qubits. As described above in connection with FIG. 11, there may be $2^{n-m}$ such words, each of width (number of bits) $2^m$. Entanglement may be performed with a gate depth of 1 using $2^m$ quantum C-Swap gates in parallel, as also shown in FIG. 11, especially stage 54.

A third process 66 disentangles the first (non-output) subset of the ancilla qubits from the second (output) subset and the data qubits.

A fourth process 68 outputs the second (output) subset of ancilla qubits and an entangled word of data qubits. As described above in connection with FIG. 11, the non-output data qubits may be discarded. Alternately, these non-output data qubits may be disentangled for reuse, for example using circuitry similar to that described in connection with FIGS. 8 and 9.

In the foregoing detailed description, various features of the invention are grouped together in one or more individual embodiments for streamlining the disclosure. This method of disclosure is not to be interpreted as reflecting an intention that the claimed invention requires more features than are expressly recited in each claim. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that the scope of the patent should not be limited to the described implementations but rather should be limited only by the spirit and scope of the following claims.

What is claimed is:

1. A circuit for entangling quantum states of a plurality of at most $2^n$ input data qubits that are initially unentangled, the circuit comprising:
   a plurality of ancilla qubits having an initially unentangled quantum state, the plurality of ancilla qubits being divided into first and second non-empty subsets, wherein the circuit provides as output qubits the second subset of ancilla qubits and a subset of the input data qubits;
   a first stage of quantum gates configured to entangle the quantum states of the plurality of ancilla qubits according to a given entangled state;
   a second stage of quantum gates configured to entangle, in parallel, the quantum state of each of the plurality of ancilla qubits with the quantum state of a corresponding pair of the data qubits; and
   a third stage of quantum gates configured to disentangle the first subset of ancilla qubits from the output qubits.

2. A circuit according to claim 1, wherein the first stage of quantum gates generates the given entangled state as a superposition of an all-zero state with an all-one state.

3. A circuit according to claim 1, wherein each ancilla qubit in the plurality of ancilla qubits is used in at most order O(n) quantum gates in the first stage of quantum gates.

4. A circuit according to claim 1, wherein the first stage of quantum gates performs an ordered sequence of quantum operations and the third stage of quantum gates performs an initial portion of the reverse-ordered sequence of quantum operations.

5. A circuit according to claim 1, wherein each ancilla qubit and each data qubit is used in exactly one quantum gate in the second stage of quantum gates.

6. A circuit according to claim 1, wherein each ancilla qubit in the plurality of ancilla qubits is used in at most order O(n) quantum gates in the third stage of quantum gates.

7. A circuit according to claim 1, wherein the third stage of quantum gates comprises quantum gates for disentangling one or more data qubits from the ancilla qubits, and quantum gates for disentangling one or more ancilla qubits in the first subset of ancilla qubits from the input data qubits.

8. A circuit according to claim 1, further comprising a first circuit for performing a first quantum computation using the output qubits, and further comprising a second circuit for performing a second quantum computation using the first subset of ancilla qubits without destroying the entanglement of the output qubits.

9. A first entangling circuit according to claim 1, further comprising a second entangling circuit according to claim 1, wherein the input data qubits of the second entangling circuit include the output qubits of the first entangling circuit.

10. A circuit according to claim 9, wherein the third stage of quantum gates in the second entangling circuit is configured to disentangle the first subset of ancilla qubits in the second entangling circuit from the output qubits of the second entangling circuit using a quantum state that is at least partially encoded in the first subset of ancilla qubits of the first entangling circuit.

11. A method of entangling quantum states of a plurality of at most $2^n$ input data qubits that are initially unentangled, the method comprising:
providing a plurality of ancilla qubits having a given entangled state, the plurality of ancilla qubits being divided into first and second non-empty subsets;
entangling, in parallel, the quantum state of each of the plurality of ancilla qubits with the quantum states of corresponding words formed from the input data qubits;
disentangling the first subset of ancilla qubits from the second subset of ancilla qubits and the data qubits; and
outputting the quantum state of the second subset of ancilla qubits and a word of the data qubits.

12. A method according to claim 10, wherein providing the plurality of ancilla qubits having the given entangled state comprises generating a superposition of an all-zero state with an all-one state.

13. A method according to claim 12, wherein generating the given entangled state comprises using each ancilla qubit in the plurality of ancilla qubits in at most order $O(n)$ quantum gates.

14. A method according to claim 12, wherein generating the given entangled state comprises performing an ordered sequence of quantum operations and disentangling comprises performing an initial portion of the reverse-ordered sequence of quantum operations.

15. A method according to claim 11, wherein entangling the quantum state comprises using each ancilla qubit and each data qubit in exactly one quantum gate.

16. A method according to claim 11, wherein disentangling comprises using each ancilla qubit in the plurality of ancilla qubits in at most order $O(n)$ quantum gates.

17. A method according to claim 11, wherein disentangling the first subset of ancilla qubits from the second subset of ancilla qubits and the data qubits comprises disentangling one or more data qubits from the ancilla qubits, and disentangling one or more ancilla qubits in the first subset of ancilla qubits from the input data qubits.

18. A method according to claim 11, further comprising performing a first quantum computation using the output qubits, and further comprising performing a second quantum computation using the first subset of ancilla qubits without destroying the entanglement of the output qubits.

19. A method according to claim 11 performed a plurality of times, wherein the input data of each performance except the first performance comprises the output data of the immediately preceding performance.

20. A method according to claim 19, wherein, in each performance except the first, disentangling the first subset of ancilla qubits from the second subset of ancilla qubits and the data qubits comprises using a quantum state that is at least partially encoded in the qubits disentangled by the immediately preceding performance.

* * * * *